United States Patent
Park (10) Patent No.: US 8,050,192 B2
(45) Date of Patent: Nov. 1, 2011

(54) PORT FORWARDING CONFIGURATION SYSTEM AND METHOD FOR WIRE AND WIRELESS NETWORKS

(75) Inventor: Se-Dong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 555 days.

(21) Appl. No.: 11/598,783

(22) Filed: Nov. 14, 2006

(65) Prior Publication Data

US 2007/0110039 A1    May 17, 2007

(30) Foreign Application Priority Data

Nov. 16, 2005 (KR) ........................ 10-2005-0109891

(51) Int. Cl.
    *G01R 31/08*    (2006.01)
    *H04L 12/66*    (2006.01)

(52) U.S. Cl. ........................ 370/254; 370/352; 370/338

(58) Field of Classification Search .................. 370/352, 370/401, 338, 389, 395.1, 395.54; 709/223, 709/220, 230, 224, 245, 227, 225; 725/105; 455/517, 519

See application file for complete search history.

(56) References Cited

U.S. PATENT DOCUMENTS

| | | | |
|---|---|---|---|
| 7,310,664 B1 * | 12/2007 | Merchant et al. | 709/220 |
| 7,516,211 B1 * | 4/2009 | Gourlay et al. | 709/224 |
| 7,522,929 B2 * | 4/2009 | Hashizume | 455/517 |
| 7,523,186 B1 * | 4/2009 | Waters | 709/223 |
| 7,567,805 B2 * | 7/2009 | Cox et al. | 455/435.1 |
| 7,633,948 B2 * | 12/2009 | Yokomitsu et al. | 370/395.54 |
| 2004/0119814 A1 * | 6/2004 | Clisham et al. | 348/14.08 |
| 2006/0161960 A1 * | 7/2006 | Benoit | 725/105 |
| 2006/0221940 A1 * | 10/2006 | Ong et al. | 370/352 |
| 2007/0025306 A1 * | 2/2007 | Cox et al. | 370/338 |

* cited by examiner

*Primary Examiner* — Hanh Nguyen

(74) *Attorney, Agent, or Firm* — H.C. Park & Associates, PLC

(57) ABSTRACT

In a port forwarding configuration system and method for wire and wireless networks, when an Internet protocol (IP) is allocated according to a request from a wireless terminal of a private network and an initialization information message is transmitted by the terminal, a port to be used by the terminal is configured and a configured port information message is transmitted to the terminal so as to open a port for the terminal, thereby performing a remote connection of a user terminal to the wireless terminal through port forwarding.

14 Claims, 5 Drawing Sheets

FIG. 5

PORT FORWARDING CONFIGURATION SYSTEM AND METHOD FOR WIRE AND WIRELESS NETWORKS

CLAIM OF PRIORITY

This application makes reference to, incorporates the same herein, and claims all benefits accruing under 35 U.S.C. §119 from an application for PORT FORWARDING CONFIGURATION SYSTEM AND METHOD FOR WIRE AND WIRELESS NETWORKS earlier filed in the Korean Intellectual Property Office on the 16 Nov. 2005 and there duly assigned Serial No. 10-2005-109891.

BACKGROUND OF THE INVENTION

1. Technical Field

The present invention relates to a port forwarding configuration system and method for wire and wireless networks.

2. Related Art

With a recent increase in the population using a superhighway communication network and the Internet, the tendency is to utilize the Internet for controlling and monitoring domestic appliances or machines. Of course, even before the diffusion of the Internet, efforts had been made to control various kinds of equipment through the modification of the ring, but such efforts failed because of the technical limitations thereof. However, with the active development in various wire and wireless communication technologies, such as power line communication or wireless communication, the interest in and demand for the home network have increased.

A home network is a network for the control and automation of lighting, air conditioners, and domestic appliances in use for the home or office, and the network operates at a low speed of 1 Mbps or less, and should be configured to ensure compatibility between different types of equipment as well as low cost.

Particularly, for Internet remote controlling and monitoring, it is necessary to construct a network between a home gateway, where a web server is built-in, and a controlled target device. Since a microprocessor is generally provided in the lighting, air conditioners, and home appliances for home use, and since it supports most of the RS-232C serial communication ports for a host computer, it can be easily connected to the home gateway.

However, in order to remotely control the controlled target devices under a wireless local area network (LAN) through the Internet, there is a problem in that the user should configure a fixed Internet protocol (IP) and a port to be used while directly accessing a configuration program of the controlled target device, and should then manually configure port forwarding to the fixed IP and the port to be used for the controlled target device while accessing a configuration program of a wire and wireless sharing device (AP).

SUMMARY OF THE INVENTION

It is, therefore, an object of the present invention to provide a port forwarding configuration system and method for wire and wireless networks capable of remotely controlling in an authorized network through communication of wire and wireless sharing device and terminals without the separate configuration of the sharing device and terminals in a private network, wherein the terminals interacting with the wire and wireless sharing device (AP, OfficeServ SOHO) are dynamically allocated an Internet protocol (IP) with a dynamic host configuration protocol (DHCP).

To achieve the above and other objects, in accordance with an aspect of the present invention, a wire and wireless sharing device comprises: a control module which, if an Internet protocol (IP) is allocated according to a request from a controlled target terminal of a private network and an initialization information message is transmitted from the corresponding terminal, configures a port to be used by the corresponding terminal and transmits a configured port information message to the corresponding terminal, thereby performing port forwarding to the corresponding terminal.

The control module may automatically allocate an IP address to the controlled target terminal in a dynamic host configuration protocol (DHCP) manner.

The initialization information message may include media access control (MAC) address information or private IP address information of the corresponding terminal.

Upon rebooting, the control module releases the configured port to the corresponding terminal and, if the corresponding terminal is connected again, checks the pre-stored MAC address of the corresponding terminal so as to configure a port according to originally configured port information.

The control module receives a life message periodically transmitted from the controlled target terminal so as to check an operating state of the corresponding terminal, and if the life message is not transmitted for a certain time, releases the configured port to the corresponding terminal so as to turn off the connection status thereof.

The control module includes: a DHCP server unit for allocating an IP address according to a request from the controlled target terminal; a message receiving unit for receiving the initialization information message or life message transmitted by the controlled target terminal; a port forwarding configuring unit for configuring a port to be used by the corresponding terminal according to private IP address information of the corresponding terminal included in the initialization information message received in the receiving unit; an MAC address storage unit for mapping port information configured by the port forwarding configuring unit to the private IP address information and MAC address information included in the initialization information message, and for storing the mapped information; a message transmitting unit for transmitting the port information message configured by the port forwarding configuring unit to the corresponding terminal; and a display unit for displaying the connection state of at least one terminal according to a key input signal initiated by the user.

The display unit may display MAC address list information of the terminal being connected or unconnected to the control module.

In accordance with another aspect of the present invention, a port forwarding terminal comprises: a port configuration module which, after being allocated an Internet protocol (IP) address within a service area of a corresponding wire and wireless sharing device of a private network and transmitting an initialization information message to the sharing device, configures a port according to port information transmitted by the sharing device.

The port configuration module includes a dynamic host configuration protocol (DHCP) client unit for requesting the wire and wireless sharing device for an IP allocation, a message transmitting unit for transmitting the initialization information message or life message to the sharing device, a message receiving unit for receiving a configured port message or life response message from the sharing device, and a port configuring unit for configuring the port according to port information transmitted by the sharing device.

In accordance with still another aspect of the present invention, a wire and wireless network system comprises: a controlled target terminal for transmitting an initialization information message after being allocated an Internet protocol (IP) address within a corresponding service area of a private network; and a wire and wireless sharing device which allocates the IP address according to a request from the controlled target terminal, and which, when the initialization information message is transmitted by the corresponding terminal, configures a port to be used by the corresponding terminal and transmits the configured port information message to the corresponding terminal, thereby performing port forwarding to the corresponding terminal.

In accordance with yet still another aspect of the present invention, a port forwarding configuration method for a wire and wireless sharing device comprises the steps of: allocating an Internet protocol (IP) address according to a request from a controlled target terminal of a private network; when an initialization information message is transmitted from a certain terminal, configuring a port to be used by the corresponding terminal; and transmitting the configured port information message to the corresponding terminal, thereby configuring port forwarding to the corresponding terminal.

The method may further comprise: releasing the configured port to the corresponding terminal when the wire and wireless sharing device is rebooted, and if the corresponding terminal is connected again, checking a pre-stored media access control (MAC) address of the corresponding terminal, thereby configuring a port according to originally configured port information.

In accordance with an embodiment of the present invention, a port forwarding configuration method for a wire and wireless sharing device comprises the steps of: providing an allocated Internet protocol (IP) address within a corresponding wire and wireless sharing device of a private network; causing a terminal having an IP address which is allocated to transmit an initialization information message to the sharing device; and configuring a port according to port information transmitted by the sharing device.

In accordance with another embodiment of the present invention, a port forwarding configuration method for a wire and wireless network comprises the steps of: providing a terminal in a private network which is allocated an Internet protocol (IP) address within a service area of a corresponding wire and wireless sharing device; causing a terminal having an IP address which is allocated to transmit an initialization information message to the sharing device; receiving the initialization information message, and configuring a port to be used by the corresponding terminal; mapping configured port information to information included in the initialization information message, and storing the mapped information; transmitting the configured port information message to the corresponding terminal; and configuring a port according to the transmitted port information message.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In describing the embodiments of the invention, if it is determined that the detailed description on the related known function or construction may unnecessarily make the gist of the invention ambiguous, it will be omitted.

Figure 1:
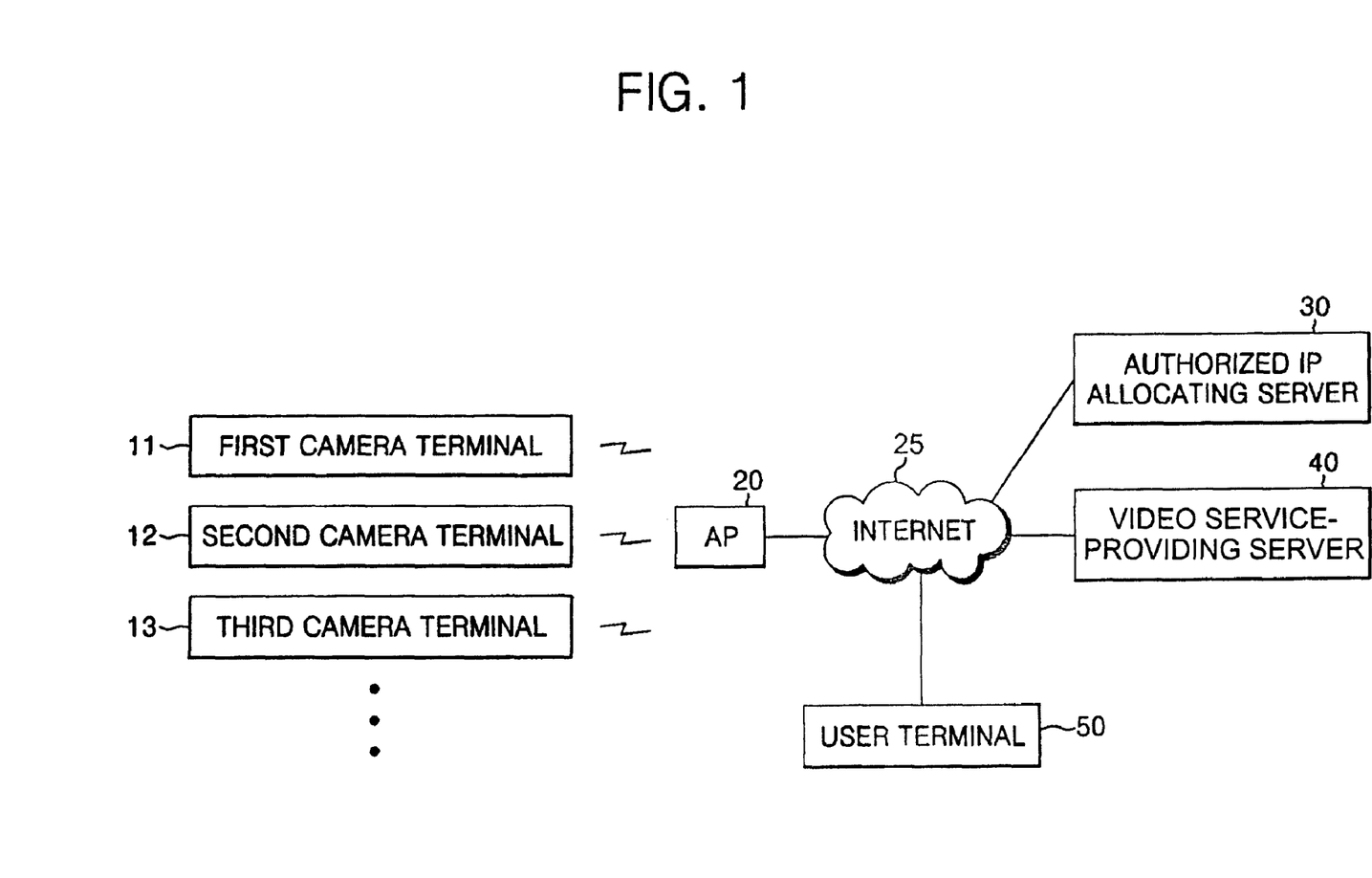
FIG. 1 is a diagram of wireless local area network (LAN) camera services using an authorized Internet protocol (IP)

FIG. 1 is a diagram of wireless local area network (LAN) camera services using an authorized Internet protocol (IP).

Referring to FIG. 1, a commonly used wireless LAN camera service system is configured to include a plurality of wireless LAN camera terminals 11, 12 and 13, a wire and wireless sharing device (AP) 20 connected to the Internet 25, and an authorized IP allocating server 30, a video service-providing server 40, and a user terminal 50 also connected to the Internet 25.

That is, the plurality of wireless LAN camera terminals 11, 12 and 13 are respectively allocated the authorized IP addresses by the authorized IP allocating server 30, and transmit their allocated authorized IP addresses to the video service-providing server 40.

Thus, the user gains access to the video service-providing server 40 using the user terminal 50 to perform user authentication, and transmits information for authorized IP addresses of the wireless LAN camera terminals 11, 12 and 13 from the video service-providing server 40.

Accordingly, the user can directly gain access to any one of the wireless LAN camera terminals 11, 12 and 13 using authorized IP addresses of the camera terminals 11, 12 and 13 transmitted from the video service-providing server 40 via the user terminal 50, and can monitor moving picture information provided in real time from the accessed wireless LAN camera terminal 11, 12 or 13.

Figure 2:
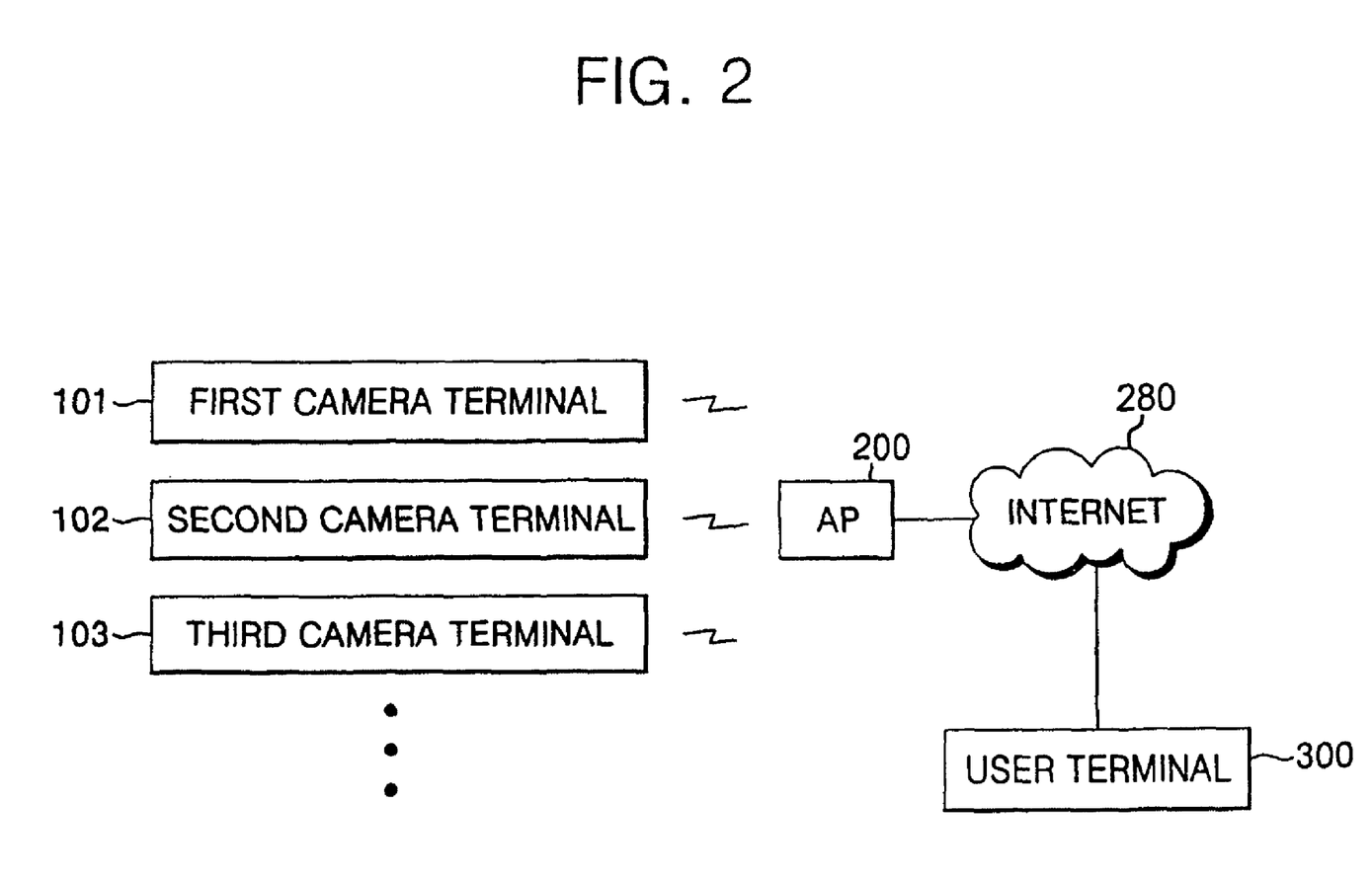
FIG. 2 is a diagram of wireless LAN camera services through port forwarding in a private network according to the present invention.

FIG. 2 is diagram of wireless LAN camera services through port forwarding in a private network according to the present invention.

Referring to FIG. 2, the wireless LAN camera service system operating through port forwarding of the present invention is generally configured to include a plurality of wireless LAN camera terminals 101, 102 and 103, a wire and wireless sharing device (AP) 200 connected to the Internet 280, and a user terminal 300 also connected to the Internet 280.

The plurality of wireless LAN camera terminals 101, 102 and 103 are installed on particular regions, and provide the user with image information picked up in real time.

That is, the plurality of wireless LAN camera terminals 101, 102 and 103 are connected to the wire and wireless sharing device (AP) 200 in the order in which they are initially turned on by the user.

In such a state where the wireless LAN camera terminals 101, 102 and 103 are connected to the wire and wireless sharing device (AP) 200, the respective camera terminals request the sharing device (AP) 200 for private IP address allocation, and are allocated different private IP addresses.

The wire and wireless sharing device (AP) 200 stores the media access control (MAC) addresses of the initially connected camera terminals in turn, and if a camera terminal is out of order, or the user tries to replace the same, the user can delete the stored MAC address of the corresponding camera terminal via a user interface.

When the wire and wireless sharing device (AP) 200 is requested for the private IP allocation from the plurality of wireless LAN camera terminals 101, 102 and 103, it automatically allocates the different private IP addresses to each camera terminal through a dynamic host configuration protocol (DHCP).

In addition, the wire and wireless sharing device (AP) 200 allocates the different private IP addresses to the camera terminals 101, 102 and 103, and then receives an initialization information message (INIT message) transmitted from a particular camera terminal. Herein, the INIT message includes MAC address information and a private IP address of the camera terminal that has transmitted the message.

The wire and wireless sharing device (AP) 200 separately stores and manages MAC address information included in the initialization information message, and performs port forwarding identifying the camera terminal that has transmitted an initialization information message through the private IP address.

That is, the wire and wireless sharing device (AP) 200 identifies a camera terminal that has transmitted the initialization information message through the private IP address, configures a port to be used by the same camera terminal, and transmits the configured port information to that camera terminal.

Accordingly, the corresponding camera terminal which receives the configured port information message from the sharing device (AP) 200 configures the port according to port information transmitted by the sharing device (AP) 200.

In this manner, when port forwarding has been completed while the sharing device (AP) 200 and the corresponding camera terminal are configured with the same port, the private network (wireless LAN network) and the authorized network (Internet network) are connected to each other, and the user accessing the sharing device (AP) 200 via the Internet 280 can check image information picked up by the corresponding camera in real time.

Furthermore, if the life messages each periodically transmitted at certain intervals from the camera terminals 101, 102 and 103, are not transmitted for a certain time, the wire and wireless sharing device (AP) 200 perceives that the power of the camera terminal(s) has been turned off, and releases the port forwarding pre-configured in the corresponding camera terminal(s), thereby turning off the connection thereof. Herein, the life message is a message informing the sharing device (AP) 200 that a camera terminal is operating normally.

In addition, upon rebooting, the wire and wireless sharing device (AP) 200 initializes pre-configured port forwarding, thus preventing overlapping configuration.

That is, when the sharing device (AP) 200 is rebooted, the pre-configured port forwarding path is closed, the camera terminal(s) is (are) connected again to the sharing device (AP) in a state wherein the port forwarding path is closed, and the sharing device (AP) newly configures the port to be used by the respective camera terminals with the initially configured port.

The user terminal 300 is used for real-time monitoring of image information picked up by the port forwarding camera terminal connected to the sharing device (AP) 200, and includes personal computers (PCs), notebooks, personal digital assistants (PDAs), and the like.

Figure 3:
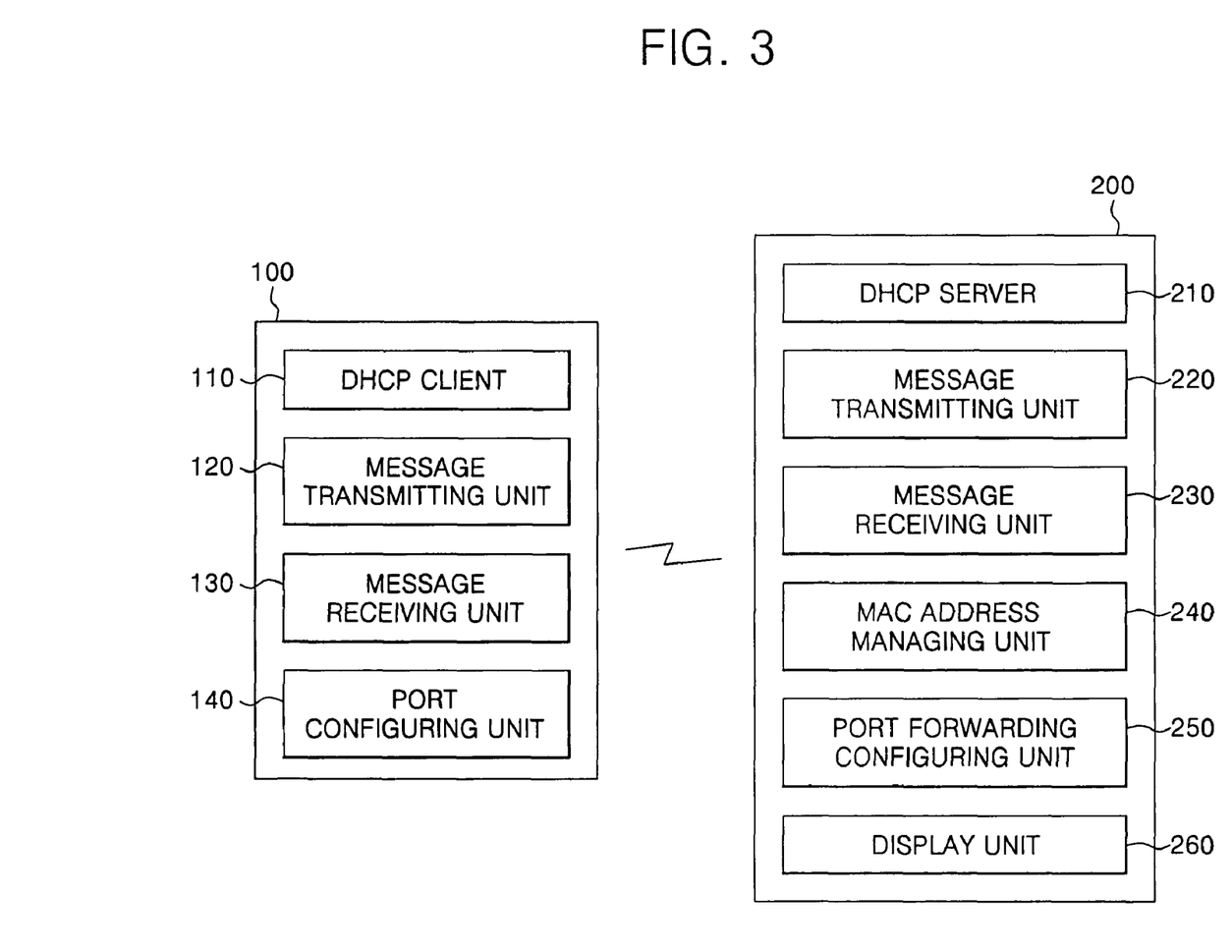
FIG. 3 is a diagram of a port forwarding configuration through communication between the camera terminal of FIG. 2 and a wire and wireless sharing device (AP)
Figure 4:
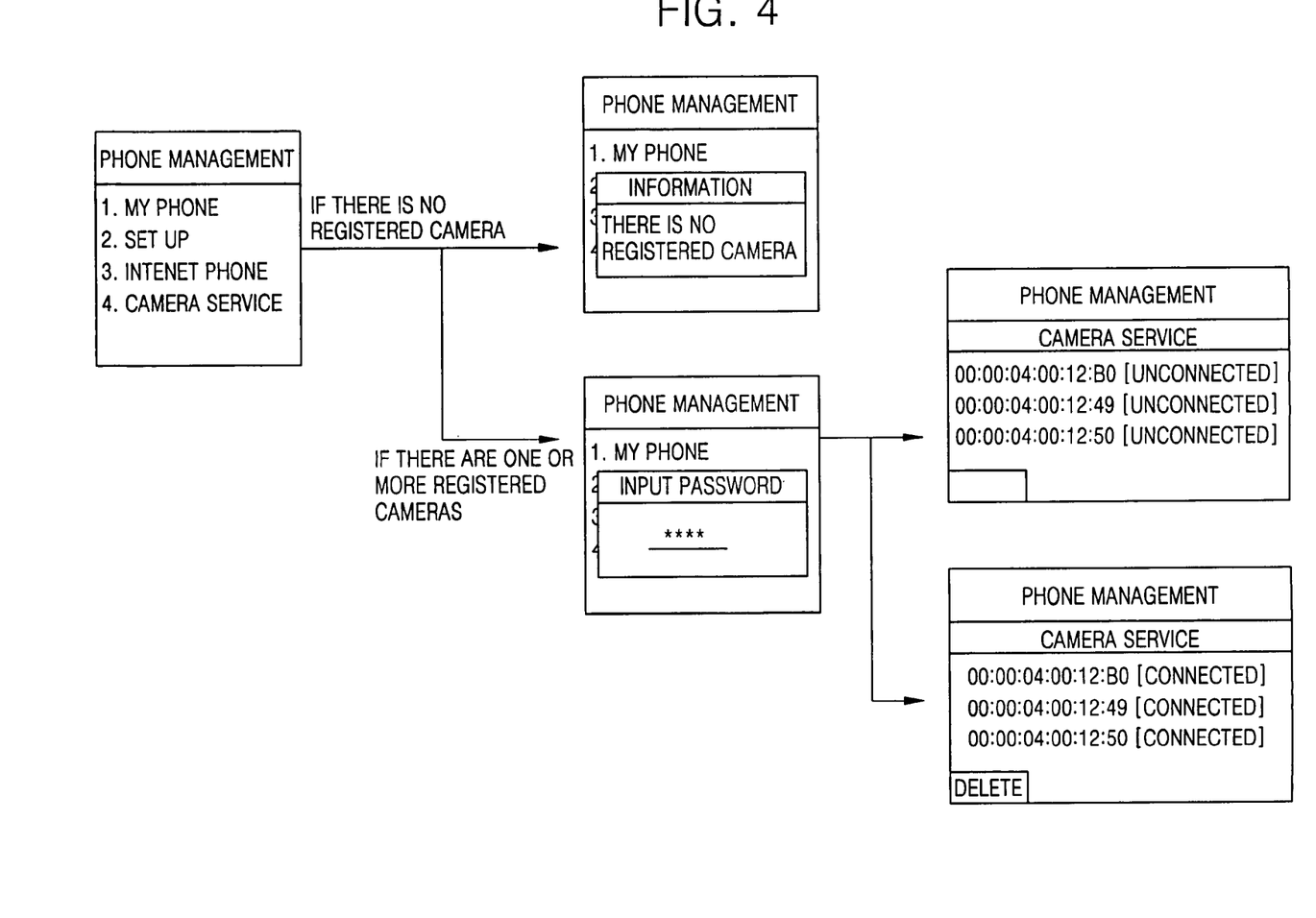
FIG. 4 is a diagram of the connection state of a camera terminal displayed via the display unit of a wire and wireless sharing device (AP) according to the present invention.

FIG. 3 is diagram of a port forwarding configuration through communication between the camera terminal of FIG. 2 and the wire and wireless sharing device (AP), and FIG. 4 is a diagram of the connection state of the camera terminal displayed via the display unit of the wire and wireless sharing device (AP) according to the present invention.

Referring to FIG. 3, the camera terminal 100 includes a DHCP client unit 110, a message transmitting unit 120, a message receiving unit 130, and a port configuring unit 140.

The wire and wireless sharing device (AP) 200 of the invention includes a DHCP server 210, a message transmitting unit 220, a message receiving unit 230, a MAC address managing unit 240, a port forwarding configuring unit 250, and a display unit 260.

Hereinafter, a procedure for performing port forwarding through communication between the camera terminal 100 and sharing device (AP) 200 as constructed above will be explained.

First, the DHCP client unit 110 of the camera terminal 100 requests the DHCP server 210 of the sharing device (AP) 200 for a private IP address.

Then, in response to the request from the DHCP client unit 110, the DHCP server 210 of the sharing device (AP) 200 automatically allocates the private IP address of the camera terminal 100 through the DHCP.

The message transmitting unit 120 of the camera terminal 100 transmits, to the message receiving unit 230 of the sharing device (AP) 200, its MAC address information and private IP address allocated by the DHCP server 210.

The message receiving unit 230 of the sharing device (AP) 200 receives the MAC address information and the private IP address of the camera terminal as transmitted by the message transmitting unit 120 of the camera terminal 100, and transmits the MAC address and private IP address of the camera terminal to the MAC address managing unit 240 and the port forwarding configuring unit 250, respectively, thereby requesting port forwarding.

The MAC address managing unit 240 stores and manages MAC address information of the camera terminal transmitted by the message receiving unit 230.

That is, the MAC address managing unit 240 stores port information configured by the port forwarding configuring unit 250, mapping it to private IP address and MAC address information of the corresponding terminal included in the initialization information message transmitted by the message receiving unit 230.

The port forwarding configuring unit 250 receives the private IP address of the camera terminal as transmitted by the message receiving unit 230 so as to automatically configure port forwarding.

That is, the port forwarding configuring unit 250 identifies the camera terminal which has transmitted the INIT message through private IP information of the camera terminal transmitted by the message receiving unit 230, and receives the initialization information message so as to automatically configure a port to be used by the corresponding camera terminal.

For example, if an initialization information message is transmitted from camera terminal 100, the port forwarding configuring unit 250 perceives transmission of the initialization information message from camera terminal 100 configures a port automatically, and bypasses the configured port to a private IP address of the camera terminal 100 so as to open a connection path, thereby connecting a private network (wireless LAN network) and an authorized network (Internet network) with each other.

In this manner, when MAC address information of the corresponding camera terminal 100 is stored in the MAC address managing unit 240 of the wire and wireless sharing device (AP) 200 and port forwarding is automatically configured by the port forwarding configuring unit 250, the message transmitting unit 220 of the sharing device (AP) 200 transmits a port information message, to be used by the camera terminal 100, to the message receiving unit 130 of the camera terminal 100.

The message receiving unit 130 of the camera terminal 100 receives the port information message from the message transmitting unit 220 of the sharing device (AP) 200, transmits the received port information message to the port configuring unit 140, and requests port configuration.

The port configuring unit 140 of the camera terminal 100 receives the port information message from the message receiving unit 130 so as to configure a port to be used by the camera terminal 100, thereby completing the port forwarding process.

The display unit 260 of the sharing device (AP) 200 displays MAC address list information of the camera terminal 100 in currently connected or unconnected status according to user's key input signal, so that the user can directly check the connection status of the plurality of camera terminals.

In other words, as illustrated in FIG. 4, if a user tries to check the connection status of camera terminals, the user selects a camera service menu item from a phone management mode panel including, for example, menus of: 1. my phone; 2. setup; 3. Internet phone; and 4. camera service.

When the user selects the camera service menu item, if there is no camera terminal registered in the wire and wireless sharing device (AP), the display screen displays a message such as "There is no registered camera".

If one or more cameras registered in the sharing device (AP) are installed, the display screen displays a password input window, and the user inputs a password for user authentication.

Then, after completion of user authentication, the wire and wireless sharing device (AP) displays MAC address list information of the camera terminal in connected or unconnected status to the sharing device (AP).

For example, FIG. 4 shows that the MAC addresses of the three camera terminals connected and unconnected to the wire and wireless sharing device (AP) are "00:00:04:00:12:B0", "00:00:04:00:12:49", and "00:00:04:00:12:50".

Herein, the unconnected status of a camera terminal not connected to the sharing device (AP) means that the camera terminal is in a power-off state, or that the camera terminal is not within a service area of the sharing device (AP), while connected status means that the wire and wireless sharing device (AP) periodically receives, from a camera terminal, a life message reporting that the camera terminal is operating normally.

A delete button on a display screen is used in selecting and deleting a MAC address of a certain camera terminal when a camera is out of order, or when the user desires to use only two cameras of three cameras.

Figure 5:
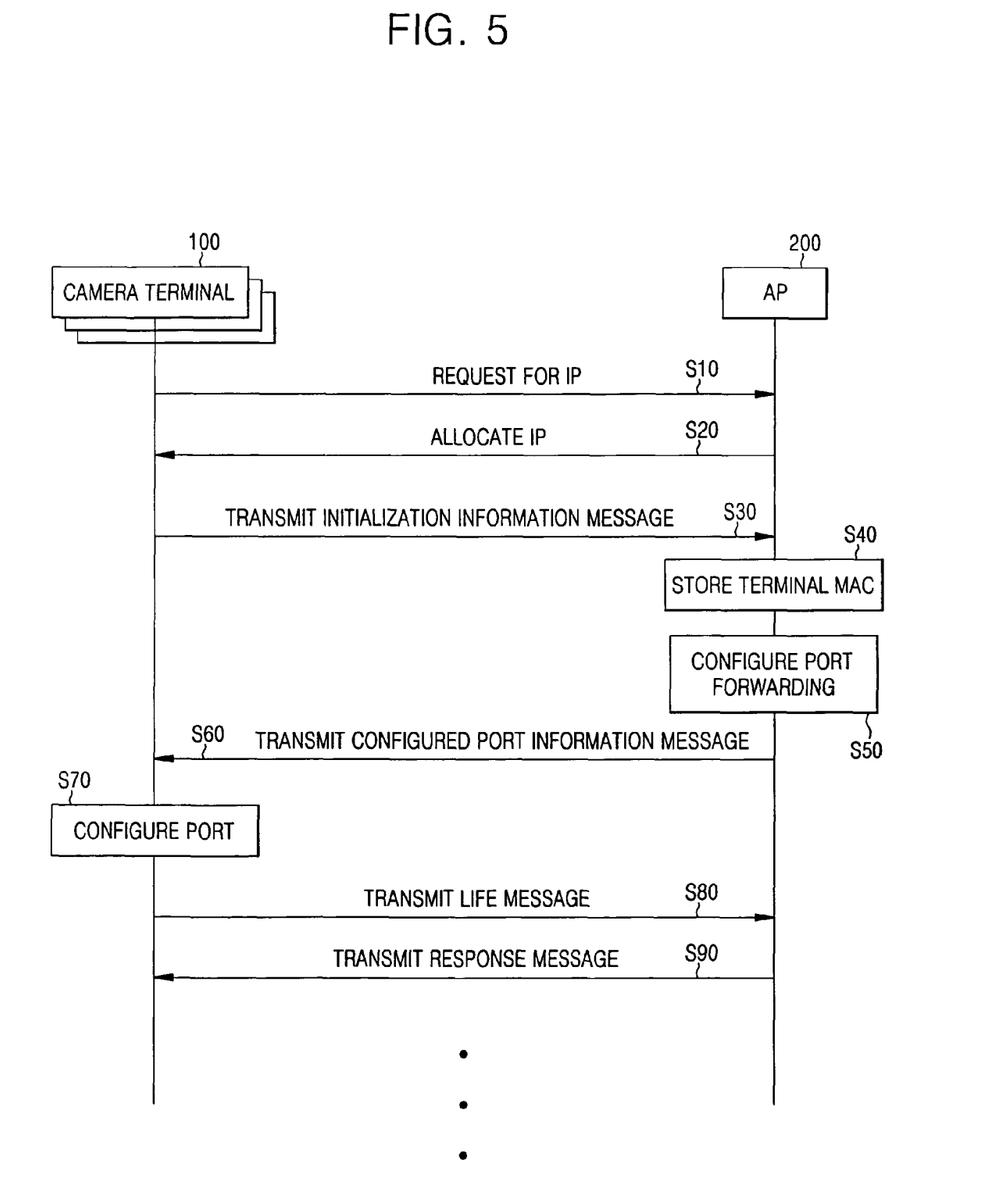
FIG. 5 is a diagram of a procedure for configuring port forwarding with communication between a camera terminal and wire and wireless sharing device (AP) according to the present invention.

FIG. 5 is a diagram of a procedure for configuring port forwarding with communication between a camera terminal and wire and wireless sharing device (AP) according to the present invention.

Referring to FIG. 5, a camera terminal 100 requests a wire and wireless camera sharing device (AP) 200 to allocate a private IP address (S10).

The wire and wireless sharing device (AP) 200 then allocates the private IP address in a DHCP manner according to the request from the camera terminal 100 (S20).

The camera terminal 100 allocated the private IP address requests the wire and wireless sharing device (AP) 200 for port forwarding by transmitting an initialization information message including MAC address information and allocated private IP address thereof to the sharing device (AP) 200 (S30). Herein, the initialization information message is a message such as "0x28INIT=123456789012:000x29", which means in detail the following:

First, a port forwarding request message has a structure which includes a head (0x28), a body (INIT=123456789012:000), and a tail (000x29).

Herein, INIT in the body means a message type, "123456789012" indicates a MAC address of the camera terminal 100, and "000" indicates a message ID.

Next, the wire and wireless sharing device (AP) 200 which has received MAC address information of the camera terminal 100 stores the transmitted MAC address information (S40), and automatically configures port forwarding for connection between a private network and an authorized network through private IP information of the corresponding camera terminal (S50).

That is, the wire and wireless sharing device (AP) 200 automatically configures a port to be used by the corresponding camera terminal, checks the MAC address of the corresponding camera terminal, and transmits a message relative to the configured port information to the corresponding camera terminal (S60). Herein, the port information message is of a message type such as, in particular, "0x28INIT=OK@45001-45002:000x29", wherein "45001-45002" indicates a configured port number.

Then, the camera terminal 100, which has received the port information message from the sharing device (AP) 200, also configures a port with a "45001-45002" port number configured by the sharing device (AP) 200 (S70), so that the port forwarding procedure is completed.

Then, the camera terminal 100 periodically transmits to the sharing device 200 a life message informing of its normal operation (S80). When a normal operation message of the camera terminal 100 is received, the sharing device 200 checks a MAC address of the corresponding camera terminal, and transmits a corresponding response message (S90).

Herein, the life message indicating that the camera terminal is operating normally is a type of message such as "0x28LIFE=123456789012:001x29", wherein "123456789012" indicates the MAC address of the corresponding camera terminal.

The corresponding response message is a type of message such as "0x28LIFE=OK@45001-45002:001x29", wherein "45001-45002" indicates the port number allocated to the corresponding camera terminal.

According to the present invention, in a private network environment in which a plurality of terminals interacting with a wire and wireless sharing device (AP, OfficeSery SOHO) are dynamically allocated IP addresses in a DHCP manner, the user granted access to an authorized network can remotely access the controlled target terminals in a wireless LAN environment, by configuring port forwarding to the sharing device and terminals via communication therebetween without separate configuration.

While the invention has been described in conjunction with various embodiments, the invention is not limited to them, and accordingly many alternative modifications and variations will be apparent to persons skilled in the art in light of the foregoing detailed description. The foregoing description is intended to embrace all such alternatives and variations falling with the spirit and broad scope of the appended claims.

What is claimed is:

1. A wire and wireless network system, comprising:

a terminal to transmit an initialization information message after being allocated a private Internet protocol (IP) address within a service area of a private network; and a wire and wireless sharing device to allocate the IP address according to a request transmitted from the terminal, and when the initialization information message is transmitted by the terminal, the wire and wireless sharing device configures a port to be used by the terminal and transmits a configured port message to the terminal, with the port configured to connect the private network to an authorized Internet, thereby performing port forwarding to the terminal by the wire and wireless sharing device, wherein the terminal comprises:

a dynamic host configuration protocol (DHCP) client unit to request the wire and wireless sharing device for allocation of the private IP address;

a message transmitting unit to transmit the initialization information message and a life message to the wire and wireless sharing device;

a message receiving unit to receive the configured port message and a response message from the wire and wireless sharing device, the response message being received in response to the transmitted life message; and a port configuring unit to configure the port according to port information provided by the configured port message transmitted by the wire and wireless sharing device.

2. The wire and wireless network system as claimed in claim 1, wherein the initialization information message comprises a media access control (MAC) address and the private IP address of the terminal.

3. The wire and wireless network system as claimed in claim 1, wherein the terminal is allocated the private IP address by the wire and wireless sharing device in a DHCP manner.

4. The wire and wireless network system as claimed in claim 1, wherein the wire and wireless sharing device automatically allocates the private IP address to the terminal in the DHCP manner.

5. The wire and wireless network system as claimed in claim 1, wherein the wire and wireless sharing device comprises:

a DHCP server unit to allocate the private IP address according to the request received from the terminal;

a message receiving unit to receive the initialization information message and the life message transmitted by the terminal;

a port forwarding configuring unit to configure the port to be used by the terminal according to the private IP address provided in the initialization information message received by the message receiving unit;

a MAC address storage unit to map port information, configured by the port forwarding configuring unit, to the IP address and the MAC address provided in the initialization information message, and for storing the mapped port information;

a message transmitting unit to transmit the configured port message, configured by the port forwarding configuring unit, to the terminal; and a display unit to display a connection state of at least one terminal according to a key input signal by a user.

6. The wire and wireless network system as claimed in claim 5, wherein the display unit displays MAC address list information of the terminal and a connection status of the terminal to the wire and wireless sharing device.

7. The wire and wireless network system as claimed in claim 1, wherein upon rebooting, the wire and wireless sharing device releases the configured port to the terminal and, when the terminal is reconnected, the wire and wireless sharing device checks a pre-stored MAC address of the terminal so as to configure a port according to information for the port originally configured.

8. The wire and wireless network system as claimed in claim 1, wherein the wire and wireless sharing device receives life messages periodically transmitted by the terminal so as to check an operating state of the terminal, and when the life message is not transmitted for a certain period of time, the wire and wireless sharing device releases the configured port to the terminal so as to turn off a connection status thereof.

9. A port forwarding configuration method of a terminal, the method comprising:

requesting a wire and wireless sharing device for allocation of an Internet protocol (IP) address;

transmitting an initialization information message to the wire and wireless sharing device;

receiving a configured port message from the wire and wireless sharing device;

configuring a port according to port information provided by the configured port message transmitted by the wire and wireless sharing device;

transmitting a life message to the wire and wireless sharing device; and receiving a response message from the wire and wireless sharing device, the response message being received in response to transmitting the life message, wherein the life message is a message informing the wire and wireless sharing device that the terminal operates normally.

10. The port forwarding configuration method as claimed in claim 9, wherein the IP address allocation is allocated in a dynamic host configuration protocol (DHCP) manner.

11. The port forwarding configuration method as claimed in claim 9, wherein the initialization information message comprises a media access control (MAC) address and the IP address of the terminal.

12. A port forwarding configuration method of a wire and wireless network system, the method comprising:

requesting, by a terminal, a wire and wireless sharing device to allocate an Internet protocol (IP) address;

allocating, by the wire and wireless sharing device, a private IP address according to a request transmitted from the terminal;

transmitting, by the terminal, an initialization information message to the wire and wireless sharing device;

configuring, by the wire and wireless sharing device, a port to be used by the terminal, with the port connecting a private network to an authorized Internet;

transmitting, by the wire and wireless sharing device, a configured port information message to the terminal;

receiving, by the terminal, the configured port information message from the wire and wireless sharing device;

configuring, by the terminal, the port according to the configured port information message transmitted by the wire and wireless sharing device;

transmitting, by the terminal, a life message to the wire and wireless sharing device; and receiving, by the wire and wireless sharing device, the life message and transmitting a response message of the life message to the terminal after checking a media access control (MAC) address of the terminal,
wherein the life message is a message informing the wire and wireless sharing device that the terminal operates normally.

13. The port forwarding configuration method as claimed in claim 12, further comprising:
releasing, by the wire and wireless sharing device, the configured port to the terminal when the wire and wireless sharing device is rebooted; and
when the terminal is reconnected, checking, by the wire and wireless sharing device, a pre-stored MAC address of the terminal so as to configure a port according to information for the port originally configured.

14. The port forwarding configuration method as claimed in claim 12, wherein the initialization information message comprises a MAC address and the private IP address of the terminal.

* * * * *